United States Patent Office 3,689,312
Patented Sept. 5, 1972

3,689,312
SPRAY METHOD FOR PRODUCING A GLARE-REDUCING COATING

George E. Long III, Neffsville, and Donald Walter Bartch, Columbia, Pa., assignors to RCA Corporation
No Drawing. Filed Feb. 8, 1971, Ser. No. 113,737
Int. Cl. B44d 1/08
U.S. Cl. 117—94
10 Claims

ABSTRACT OF THE DISCLOSURE

A method for producing a glare-reducing coating upon a surface, for instance the external glass surface of the viewing window of an evacuated and sealed cathode-ray tube, comprising preparing a coating formulation consisting essentially of a siliceous polymer, an organic polymer, and a volatile organic liquid vehicle for the polymers, producing a spray of discrete droplets of the formulation in a gaseous medium, intercepting the spray upon the surface to produce a layer of droplets thereon, flashing off substantially all of the vehicle present in the layer leaving a substantially dry textured polymeric layer on the surface, and then baking the dry layer at about 100 to 200° C. until the layer is cured.

BACKGROUND OF THE INVENTION

This invention relates to a spray method for producing a glare-reducing coating upon a surface, particularly on the external surface of the viewing window of a cathode-ray tube.

Specular reflection or glare is the direct reflection of ambient light from a smooth, glossy surface, such as a glass surface. Glare of light from ambient light sources interferes with the viewing of images behind a glass surface and is therefore objectionable to the viewer. In viewing video images on a television tube, for example, the glare of light from lamps and other light sources near the tube, especially the image of these light sources, may interfere with the viewing of the video picture on the tube face.

The term "glare-reducing" as used herein is the reduction in brightness and resolution of the reflected image of an ambient light source. Ideally, the reflected image is dissipated without affecting the rest of the viewing area of the television tube. For example, an ambient light source, such as an electric lamp, produces a bright reflected image of the source on the face of the tube at the viewing angle of the source. A glare-reducing coating reduces the brightness and/or the resolution of this reflected image. When applied to the viewing window of a cathode-ray tube, the coating should produce a minimal loss in resolution of the video image.

It has been suggested previously that glare may be reduced when the glass surface is coated with an alkali silicate material. See, for example, U.S. Pats. Nos. 3,114,668 to G. A. Guiles and 3,326,715 to R. G. Twells. Such coatings do not depend on destructive interference of the ambient light because of the critical thickness of the coating. Instead, the surfaces of these coatings have a controlled texture or roughness so that the ambient light is scattered. This roughness should not unduly degrade the resolution of the image to be viewed. Also, at least for practical use on television picture tubes, the glare-reducing coating should be adherent to the glass surface and be adequately hard, abrasion resistant and chemically-stable to moisture and humidity.

The processes for producing glare-reducing coatings with sodium or potassium silicates include steps for rendering these coatings resistant to humidity. Special processing, such as heat treatment above 500° C., or neutralization or removal of the free alkali, or both, is essential to produce coatings which are stable over long periods of time. Temperatures above 500° C. may cause permanent distortion of television tube faceplate panels. Hence, these prior processes are applied almost exclusively to the coating of implosion panels whose contour can be controlled during heat treatment. Also, such implosion panels do not include screen structure which may be adversely affected by the heat treatment. Processes for neutralizing and for removing free alkali require additional expense, effort, time and equipment and are therefore undesirable.

U.S. Pat. No. 2,404,426 to Max F. Bechtold et al. discloses scratch-resistant coatings for plastic or glass surfaces which may be used for decreasing the reflection of light from these surfaces. In one form, these coatings consist essentially of the product of the reaction of siliceous and organic polymers. These coatings may be produced by applying (as by dipping or flowing) a coating formulation of a siliceous polymer (such as hydrolyzed tetraethyl orthosilicate) and an organic polymer (such as polyvinyl butyral or polyvinyl acetate) in a volatile organic vehicle, and then drying and baking the coating in air at temperatures of about 75 to 100° C. In one particular previous method for coating the viewing window of a television picture tube, a quantity of the coating formulation comprised of siliceous and organic polymers is deposited on a horizontally-disposed viewing window that is rotating at about 240 r.p.m., whereby the entire surface becomes coated by the spreading of the coating formulation. Then, the coating is air-dried and baked in air at temperatures up to about 150° C.

Coatings comprised of siliceous and organic polymers have the distinct advantage of requiring relatively low baking temperatures for curing the coating in order to develop good abrasion resistance and stability. Such low temperatures permit the coating to be made, for example, directly on the viewing window of a television picture tube even after the tube is completed and is operable for displaying video images. However, it is desirable that the method be modified to improve the glare-reducing qualities of the product. Also, it is desirable that the method be so modified that the coatings are more uniform and more reproducible in order that the coatings may be mass produced.

Flow coating and dip coating procedures have many disadvantages, for example: poor reproducibility, poor thickness uniformity over the coated area, uncoated areas, excessive waste of coating material, long drying time, irregular drying patterns, poor housekeeping of the coating equipment, and danger of accident due to the spinning of the equipment. The poor reproducibility can be traced to such factors as difficulty in controlling thickness, fast skimming of the wet coating surface, solution aging, preapplication gelling, and uneven evaporation of the solvents. In addition, such methods tend to produce smooth of nearly smooth surfaces, which do not produce the optimum in glare reduction.

SUMMARY OF THE INVENTION

The novel method for producing a glare-reducing coating comprises (a) preparing a coating formulation consisting essentially of a siliceous polymer such as a hydrolyzed polysilicic acid ester, an organic polymer and a volatile organic liquid vehicle for the polymers, (b) producing a spray of discrete droplets thereof in a gaseous medium, preferably that is not saturated with the vehicle, (c) intercepting the spray upon a surface to produce a layer of droplets thereon, (d) flashing off substantially all of the vehicle from said layer of droplets leaving a substantially dry textured polymeric layer on the surface, and then (e) baking the dry layer at about 100 to 200° C. until the polymeric layer is cured.

Through the design of the formulation and the steps of spraying and flash drying, the coating has imparted thereto a rough or textured surface, which upon subsequent curing during baking, has improved glare-reducing properties with adequate adherence, abrasion resistance and chemical stability for practical use. In addition, disadvantages peculiarly associated with a spin coating, flow coating and dip coating are avoided. Because of the relatively low curing temperatures, the method may be carried out on structures which are distorted or degraded by temperatures above 400° C. For example, the coating may be applied and cured directly on the external glass surface of the viewing window of an evacuated and sealed cathode-ray tube. The novel method is easier to control so that more uniform and more reproducible coating can be made by mass production techniques.

DETAILED DESCRIPTION OF THE PREFERRED EMBODIMENTS

The following solutions are prepared in advance of the examples described below:

Solution A: Grams
  n-Propyl alcohol _____ 287.5
  Ethyl alcohol _____ 115.0
  Polyvinyl butyral, such as B74 marketed by
    Monsanto Chemical Co., St. Louis, Mo. __ 50.0

This solution should be mixed for at least 6 hours and then aged for at least 24 hours. After aging, the solution is clear, light yellow in color, with a viscosity of about 2300 centipoises and has an indefinite shelf life.

Solution B: Grams
  n-Propyl alcohol _____ 150
  Ethyl alcohol _____ 50
  Acetone _____ 70
  Partially hydrolyzed polyvinyl acetate, such as
    D383 marketed by Monsanto Chemical Co. __ 100

This solution should be mixed for at least 6 hours. The solution is translucent, faint yellow in color with a viscosity of about 60 centipoises and has an indefinite shelf life.

Solution C: Grams
  Tetraethyl orthosilicate _____ 170
  Hydrochloric acid (1% solution) _____ 30

This solution should be mixed until the solution becomes hydrolyzed and the heat of reaction is released. The solution should then be maintained at about 50° C. for about one hour and then cooled to room temperature. The solution has a shelf life of several weeks. It may be incorporated in solution D upon cooling. It will gel slowly and the viscosity will increase with time.

Solution D: Grams
  Solution A _____ 50
  Solution B _____ 20.5
  Solution C _____ 80
  Acetone _____ 50
  Eethylene dichloride _____ 23

This solution mixes readily, may be used immediately, and has a shelf life of several weeks.

Solution E: Grams
  Solution A _____ 50
  Solution B _____ 20.5
  Solution C _____ 40
  Acetone _____ 750
  Eethylene dichloride _____ 23

This solution mixes readily, may be used immediately and has a shelf life of several weeks. The proportion of acetone and ethylene dichloride may be varied widely, and other organic liquids such as methyl isobutyl ketone (MIBK) may be included with or substituted for the above organic liquids.

Solution F: Grams
  Solution A _____ 100
  Solution C _____ 40
  Acetone _____ 750

This solution mixes readily, may be used immediately and has a shelf life of about 24 hours. The proportion of acetone may be varied widely, and other organic liquids may be included with or substituted for acetone.

Solution G: Parts by volume
  Solution D _____ 1
  Acetone _____ 3
  Methyl isobutyl ketone _____ 1

This solution mixes readily, may be used immediately, and has a shelf life of several weeks. The ratios of methyl isobutyl ketone, acetone and Solution D may be adjusted to optimize the properties of the final coating, particularly in view of ambient conditions of temperature and humidity during the coating step. Other organic liquids may be included with or substituted for acetone or MIBK.

Example 1 (manual spray)

Fill the container of a De Vilbiss No. 501 air spray gun with about 100 grams of Solution E. The viewing window of a 25-inch rectangular completed and operatable color television picture tube is carefully cleaned and then placed in a workpiece holder with the viewing window of the tube facing up. Using about 25 p.s.i. air pressure to produce a wide fan spray having a high air-to-liquid ratio, spray coat the viewing window from a distance of about 18 inches. About 10 to 50 passes over the surface are required to produce the required thickness. The air gun produces a spray of minute droplets, which are believed to lose part of their vehicle content by evaporation. Substantially all of the remaining vehicle in the droplets is flashed off; that is, evaporated within seconds, after landing on the viewing window. The effect is to leave a textured or rough surface coating. The tube is then baked in air at about 150° C. for about one hour and then cooled to room temperature. During baking, water is expelled from the coating, and the coating is cured; that is, the adherence and abrasion resistance are developed.

Example 2 (manual spray)

Follow the procedure set forth in Example 1 except use Solution F in place of Solution E.

Example 3 (automatic machine spray)

This procedure is used in a multihead stroking spray machine using air spray guns adjusted to provide a wide fan spray. A quantity of Solution G is placed in the container for the spray guns. The viewing windows of several 25-inch rectangular completed and operatable color television picture tubes are carefully cleaned and loaded with their viewing windows facing up on the workpiece holders of the machine. With the air guns operating at about 60 p.s.i. air pressure, the viewing windows are passed through the spray where they are each subjected to at least 20 passes of the spray to produce the desired thickness and texture of coating. As in Example 1, spray droplets are formed which lose some vehicle content in transit before coating, and then substantially all of the remaining vehicle content flashes off immediately after coating. It has been found advantageous to keep the ambient temperature between 21 and 26° C. After coating, the tubes are placed in an oven and baked in air at about 150° C. for about one hour and then cooled to room temperature.

GENERAL CONSIDERATIONS

The coating formulation is a solution-suspension of siliceous and organic polymers in weight ratios between 90:10 and 10:90. The choice and relative proportions of the siliceous and organic polymers determine the strength, adherence, abrasion resistance and chemical stability of the final coating. The choice of the liquid vehicle and its proportion with respect to the siliceous and organic polymers affects the spraying qualities of the formulation and the roughness imparted to the coating by the spraying and flash off.

In general, one or more of any of the organic polymers identified in the above-cited Bechtold et al. patent, particularly at column 9, lines 20 to 67, may be used in the coating formulation. The siliceous polymer may be one or more of any of the acid polysilicic acid esters identified in the Bechtold et al. patent. The liquid vehicle may be a single volatile liquid but is preferably a combination of liquid vehicles which have different evaporation rates, so as to provide a better control of vehicle evaporation during spraying and flashing off. The coating formulation may contain also one or more dyes and/or one or more finely-divided, insoluble materials, such as silica, silicon carbide and alumina.

By the novel method, a clean glass support, such as the outer surface of the viewing window of a cathode-ray tube is spray coated with the specified formulation. The coating may be applied in one or several layers by either compressed air (or other gas) spraying or by airless spraying; that is with or without the agency of a stream of compressed gas. The specific technique for spraying the coating and the number of layers applied are chosen empirically to produce a coating with the desired thickness. It has been found that, when applying the coating by spraying, the coating thickness should be such as to permit the operator to resolve the three bulbs of the reflection of a three-bulb fluorescent light fixture located about 6 feet above the glass support. A thicker initial coating results in a thicker final coating. Generally, the thicker the coating, the greater the reduction in glare and the greater the loss in resolution of the luminescent image. Conversely, the thinner the coating, the lesser the reduction in glare and the lesser the loss in resolution of the luminescent image.

The sprayed coating takes on an appearance of dryness. A greater appearance of dryness is achieved (1) by spraying the surface after preheating it to about 30 to 70° C., (2) by using more air in the spray when spraying with compressed air, (3) by using a greater spraying distance when spraying on the coating, and (4) by increasing the ratio of liquid vehicle to solids in the formulation. But, when any of these is overdone, the coating crazes. The greater the appearance of dryness, the greater the glare reduction and the greater the loss in resolution of the luminescent video image. Conversely, the lesser the appearance of dryness, the lesser the glare reduction and the lesser the loss in resolution of the luminescent video image.

An important feature of the method is the dilution of the formulation with a volatile organic liquid. If the formulation is not diluted sufficiently, the resultant spray will not be minute droplets, but rather dry strings or webs. This problem holds for both airless spraying and air spraying. The webbing is caused by the sudden release of pressure on the liquid in an adiabatic expansion which accelerates the evaporation of the liquid system until only the nonvolatile resins are left. When the formulation is diluted, the thermodynamic system about the spray gun orifice is essentially the same as when the liquid was undiluted and the same amount of liquid is evaporated. Therefore, there is extra organic liquid left to keep the droplets wet. By increasing the air pressure and/or the air-to-liquid ratio of the gun and decreasing the orifice diameter, the evaporation of liquid is increased. The diluent liquid and the dilution ratio are chosen carefully so that the sprayed coating performs to the specific condition requirements.

To achieve an improved glare-reducing effect, the sprayed formulation must form discrete minute droplets before hitting the glass surface. The droplets are produced preferably in a gaseous ambient that is unsaturated with respect to the vehicle in the droplets, whereby a portion of the vehicle in the droplets evaporates prior to striking the surface to be coated. Upon impact, the droplets should be wet enough to spread and form a smooth textured surface, but not too wet to cause coating sags or runs.

It is preferred that the final dry sprayed coating is is comprised of many different phases as well as having a textured surface. The effect of both of these factors is to increase the surface for dispersing incident light. Upon this effect is placed a restriction that the coating does not unduly degrade the ability of the viewer to resolve images behind the coated glass. The formulation may comprise two organic polymers which are incompatible with each other but are dissolved in mutual solvent liquids. Upon drying, the polymers separate into different phases. If the drying occurs rapidly, the polymers separate into smaller particles and this results in better glare-reduction and poorer resolution. If drying occurs at a slow rate, the organic polymers separate into larger particles and this results in poorer glare-reduction and better resolution. The drying rate of the spray method can be controlled by choosing organic liquids with selected evaporation rates and by changing the spraying conditions, air pressure to spray gun, orifice diameter, air to liquid ratio, and the distance from the gun to the workpiece.

Acetone, ethyl alcohol, n-propanol and similar volatile organic liquids are used in the system to dissolve the polymers. They also can serve to control the drying rate. For example, increasing the acetone concentration increases the rate of drying, and a greater glare-reduction is achieved. Increasing the ethyl alcohol concentration has little effect on the glare-reduction, but drastically reduces the resolution. Increasing the propanol concentration has little effect on the final coating. Ethylene dichloride has been specifically added to the formulation to control drying, especially immediately after the coating has been sprayed and still is wet. A diluent liquid is required that is compatible with the system and provides the proper drying rate or more specifically prevents the liquid droplets from drying before they reach the surface and immediately after impact. One particularly useful diluent liquid is methyl isobutyl ketone (MIBK).

The dilution ratio helps dictate the type of coating that can be expected. With dilution ratios of from 1:1 to 2.5:1 MIBK to standard formulation, it is difficult to control the properties of the final coating. A dilution ratio of about 4:1 allows the coating to build up over a 30-second period, and the spray operator can stop the operation when the coating possesses the proper appearance. Dilution ratios of 5:1 and greater are not practical, as the resulting coating is too thin and requires too long a spray time. The preferred dilution ratio is about 4:1. At this ratio, it is possible to blend together heavy and lightly sprayed areas.

All of the above-mentioned conditions are adjusted to have a minimum or near minimum "flash off" time; that is, the spray droplets land wet but dry within 2 seconds after landing. Flash off time can be decreased by reducing the orific diameter, increasing the dilution, increasing air-to-liquid ratio, increasing the air pressure, increasing the spraying distance, warming the work piece, or by using faster evaporating solvents in the spray formulation.

The spray application may be carried out in a conventional spray booth with conventional spray equipment. Successful applications have been made with air pressures ranging from 10 to 60 pounds per square inch. The spray is dry and the gun is held about 8 to 20 inches from the work piece. The distance, spray pressure, fan width, air-to-liquid ratio and spraying speed are adjusted to have minimum "flash off."

Ten to 50 passes of the spray are usually required to build up the coating to the required thickness. The spraying should be completed in a short period of time, usually in about 30 to 300 seconds. The spray application is stopped about when the greatest thickness at which the reflection from the three bulbs of an ordinary three-bulb fluorescent light fixture spaced about six feet above the panel can still be resolved or distinguished by the operator on the coating. The coating is less than about 0.0001-inch thick. Because of the temperature of the panel, the thickness of the coating, and the high air content of the spray, the coating dries very quickly after deposit.

After spraying the surface, the coating is dried in air with care to avoid the deposition of lint or other foreign particles on the coating. Finally, the dry coating is heated at between about 100° C. and 200° C. for about 10 to 60 minutes. The baking expels water from the coating and develops the final optical and physical properties of the glare-reducing coating. The baked coating can now withstand abrasions with a pumice slurry rubbed with an applicator applied with up to about 10 pounds-per-square-inch pressure. The optimum conditions of time and temperature are determined empirically. Generally, the higher the heating temperature, the lower will be the glare reduction in the product and the higher will be the abrasion resistance. The coating may be recycled through the heating step. Recycling at a particular temperature has the effect of reaching a stable point.

The product is a glass support having a glare-reducing coating with a controlled texture or roughness. For use in television picture tubes, the coating has the quality of glare reduction; that is, the coating scatters reflected light images so that they are substantially not distinguishable as such to the viewer and, at the same time, transmits the luminescent video images on the viewing screen with sufficient resolution to permit the lines of the raster to be resolved easily. The glare-reducing coatings produced by the novel method are chemically stable to manufacturing processes and to subsequent exposure to moisture and humid atmospheres. The coatings resist abrasion and exhibit substantially flat spectral responses to both reflected and transmitted light.

We claim:

1. A method for producing a glare-reducing coating upon a surface comprising
    (a) preparing a coating formulation consisting essentially of a siliceous polymer, an organic polymer, and a volatile organic liquid vehicle for said polymers,
    (b) producing a spray of discrete droplets of said formulation in a gaseous meduim,
    (c) intercepting a portion of said spray upon said surface to produce a layer of droplets thereon,
    (d) flashing off substantially all of the vehicle present in said layer of droplets, leaving a substantially dry textured polymeric layer on said surface,
    (e) and then baking said dry layer at about 100 to 200° C.

2. The method defined in claim 1 wherein the flashing off of step (d) occurs within about 2 seconds after said intercepting step (c).

3. The method defined in claim 1 wherein said gaseous medium is unsaturated with respect to said vehicle whereby a portion of the vehicle in said droplets evaporates prior to said intercepting of step (c).

4. The method defined in claim 1 wherein said spray is produced with a stream of compressed gas.

5. The method defined in claim 1 wherein said spray is produced without the agency of a stream of compressed gas.

6. A method for producing a glare-reducing coating upon the external glass surface of the viewing window of an evacuated and sealed cathode-ray tube comprising
    (a) preparing a coating formulation consisting essentially of a hydrolyzed polysilicic acid ester, an organic polymer, and a volatile liquid vehicle for said acid ester and said polymer,
    (b) applying a stream of compressed gas to a quantity of said formulation to produce a spray of discrete droplets of said formulation in a gaseous ambient,
    (c) intercepting a portion of said spray upon said surface to produce a layer of droplets thereon,
    (d) flashing off substantially all of said vehicle present in said layer of droplets, leaving a substantially dry textured polymeric layer on said surface,
    (e) repeating steps (b), (c) and (d) until the desired thickness of said polymeric layer is built up,
    (f) and then baking said layer in air at about 100 to 200° C. until said layer is cured.

7. The method defined in claim 6 wherein said vehicle is comprised of a plurality of components with different evaporation rates.

8. The method defined in claim 6 wherein the gaseous ambient for said spray is unsaturated with respect to said vehicle, whereby a portion of said vehicle evaporates prior to said intercepting of step (c).

9. The method defined in claim 8 wherein said droplets are wet with vehicle during said intercepting of step (c) and said flashing off occurs within about 2 seconds after said intercepting of step (d).

10. The method defined in claim 9 wherein said steps (b), (c) and (d) are repeated at least ten times within about 30 to 300 seconds.

References Cited

UNITED STATES PATENTS

| | | | |
|---|---|---|---|
| 2,404,426 | 7/1946 | Bechtold et al. | 117—1388 E |
| 2,740,726 | 4/1956 | Anderson | 117—124 A |
| 3,326,715 | 6/1967 | Twells | 117—124 A |

OTHER REFERENCES

Article in Handbook of Chemistry & Physics, College Edition, 48th edition, 1967–1968, edited by Weast, Published by The Chemical Rubber Co., p. C510 relied on.

EDWARD G. WHITBY, Primary Examiner

U.S. Cl. X.R.

117—33.3, 104 R, 124 D, 1612 A